United States Patent
Hwang et al.

(10) Patent No.: US 12,190,246 B2
(45) Date of Patent: Jan. 7, 2025

(54) APPARATUS AND METHOD FOR DISTINGUISHING NEURAL WAVEFORMS

(71) Applicant: INDUSTRY-ACADEMIC COOPERATION FOUNDATION, YONSEI UNIVERSITY, Seoul (KR)

(72) Inventors: Do Sik Hwang, Seoul (KR); Jun Sik Eom, Seoul (KR); Han Byol Jang, Seoul (KR); Se Won Kim, Seoul (KR); In Yong Park, Seoul (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 974 days.

(21) Appl. No.: 16/952,523

(22) Filed: Nov. 19, 2020

(65) Prior Publication Data
US 2021/0158154 A1 May 27, 2021

(30) Foreign Application Priority Data
Nov. 21, 2019 (KR) .......... 10-2019-0150209

(51) Int. Cl.
*G06N 3/084* (2023.01)
*G06F 18/213* (2023.01)
(Continued)

(52) U.S. Cl.
CPC .......... *G06N 3/084* (2013.01); *G06F 18/213* (2023.01); *G06F 18/23* (2023.01); *G06N 3/08* (2013.01)

(58) Field of Classification Search
CPC .......... G06N 3/084; G06N 3/08; G06N 3/045; G06N 7/01; G06N 3/088; G06F 18/213;
(Continued)

(56) References Cited

U.S. PATENT DOCUMENTS

| 5,047,930 A * | 9/1991 | Martens ............... A61B 5/398 706/924 |
| 11,589,829 B2 * | 2/2023 | Khosousi ............. A61B 5/364 |

(Continued)

FOREIGN PATENT DOCUMENTS

KR    10-2015-0085007 A    7/2015

OTHER PUBLICATIONS

Leung, Howan, et al. "Wavelet-denoising of electroencephalogram and the absolute slope method: a new tool to improve electroencephalographic localization and lateralization." clinical neurophysiology 120.7 (2009): 1273-1281. (Year: 2009).*

(Continued)

*Primary Examiner* — Michael W Ayers
*Assistant Examiner* — Nicholas S Wu (57) ABSTRACT

A neural waveform distinguishment apparatus includes: a neural waveform obtainment unit that obtains multiple neural waveforms in a pre-designated manner from neural signals sensed by way of at least one electrode; a preprocessing unit that obtains multiple gradient waveforms by calculating pointwise slopes in each of the neural waveforms; a feature extraction unit comprising an encoder ensemble composed of multiple encoders, which have a pattern estimation method learned beforehand and include different numbers of hidden layers, where the feature extraction unit obtains multiple codes as multiple features extracted by the encoders respectively from the gradient waveforms and concatenates the codes extracted by the encoders respectively to extract a feature ensemble for each of the gradient waveforms; and a clustering unit that distinguishes the neural waveforms corresponding respectively to the gradient waveforms by clustering the feature ensembles extracted respectively in correspondence to the gradient
(Continued)

waveforms according to a pre-designated clustering technique.

7 Claims, 9 Drawing Sheets
(7 of 9 Drawing Sheet(s) Filed in Color)

(51) Int. Cl.
*G06F 18/23* (2023.01)
*G06N 3/08* (2023.01)
(58) Field of Classification Search
CPC .. G06F 18/23; G06F 18/2321; G06F 2218/12; G06F 18/23211; G06F 18/24133; A61B 5/388; A61B 5/7235; A61B 5/7253; A61B 5/7267; A61B 5/7264; G16H 50/20; G16H 50/70
See application file for complete search history.

(56) References Cited

U.S. PATENT DOCUMENTS

| | | | |
|---|---|---|---|
| 2012/0245481 A1* | 9/2012 | Blanco | A61B 5/7264 600/544 |
| 2021/0117705 A1* | 4/2021 | Liu | G06V 10/82 |

OTHER PUBLICATIONS

Yin, Zhong, Mengyuan Zhao, Yongxiong Wang, Jingdong Yang, and Jianhua Zhang. "Recognition of emotions using multimodal physiological signals and an ensemble deep learning model." Computer methods and programs in biomedicine 140 (2017): 93-110. (Year: 2017).*
Jordan, Jeremy. "Introduction to autoencoders." (2018): 1-17. (Year: 2018).*
Oyelade, Jelili, et al. "Data clustering: Algorithms and its applications." 2019 19th International Conference on Computational Science and Its Applications (ICCSA). IEEE, 2019. (Year: 2019).*
Mehmood, Raja Majid, Ruoyu Du, and Hyo Jong Lee. "Optimal feature selection and deep learning ensembles method for emotion recognition from human brain EEG sensors." Ieee Access 5 (2017): 14797-14806. (Year: 2017).*
Yang, Shuo, et al. "Assessing cognitive mental workload via EEG signals and an ensemble deep learning classifier based on denoising autoencoders." Computers in biology and medicine 109 (2019): 159-170. (Year: 2019).*
R. Quian Quiroga, and Z. Nadasdy, and Y. Ben-Shaul, "Unsupervised spike detection and sorting with wavelets and superparamagnetic clustering." Neural Computation, 16 (8). pp. 1661-1687. (2004).
H. F. Jelinek, et al. "Classification of pathology in diabetic eye disease." (2005).
Junkai Yi, et al "A novel text clustering approach using deep-learning vocabulary network." Mathematical Problems in Engineering (2017).
Ghulam Muhammad, et al "Automatic seizure detection in a mobile multimedia framework." IEEE Access vol. 6, pp. 45372-45383(2018).
Daniel Valencia, Amir Alimohammad "An efficient hardware architecture for template matching-based spike sorting." IEEE transactions on biomedical circuits and systems, vol. 13(3), pp. 481-492(Mar. 2019).

* cited by examiner

APPARATUS AND METHOD FOR DISTINGUISHING NEURAL WAVEFORMS

CROSS-REFERENCE TO RELATED APPLICATIONS

This application claims priority under 35 U.S.C 119(a) to Korean Patent Application No. 10-2019-0150209, filed with the Korean Intellectual Property Office on Nov. 21, 2019, the disclosure of which is incorporated herein by reference in its entirety.

BACKGROUND

1. Technical Field

The present disclosure relates to an apparatus and a method for distinguishing neural waveforms, more particularly to an apparatus and a method for distinguishing neural waveforms by using a learning-based encoder ensemble.

2. Description of the Related Art

Neural waveform tests are tests for analyzing and determining the activity of the brain by sensing the electric changes (electrical current activity) that occur when signals are transferred between the neurons of the brain.

Neural waveform tests generally use an invasive method of attaching microelectrodes to the cortex of the brain and then using the attached electrodes to take measurements by sensing and amplifying the voluntary electrical activity generated by the activity of neurons in the brain.

Currently in the field of information communication, there is active research under way on human-computer interaction (referred to hereinafter as HCI), which is to enable humans to interact with computer systems easily and conveniently, and in particular, the brain-computer interface (referred to hereinafter as the BCI), which is to enable a manipulation of a computer merely with a person's thoughts, is receiving attention as the ultimate form of HCI. For a BCI, the foremost process performed is that of accurately analyzing the measured neural waveforms.

Until now, however, neural waveform tests have been able to provide only a rough status of the test subject as described above, and there is a limit to performing in-depth analyses. This is because research on the functions of brain neurons has not yet reached a high level, and such slow progress in the level of research is due in part to the fact that distinguishing neural waveforms is not an easy task.

As described above, while neural waveforms are sensed using electrodes, the sizes of electrodes are much larger compared to the sizes of the neurons, so that in most cases, a very large amount of neural waveforms are sensed simultaneously from a single electrode. A neural waveform test may obtain neural waveforms for neurons performing meaningful activity by extracting only the neural signals having an intensity value greater than or equal to a pre-designated threshold intensity from among the multiple neural signals sensed through the electrode, but in most cases, even with the neural waveforms thus separately obtained, about two to ten neural waveforms are detected intermingled with one another. Thus, it is difficult to accurately separate the multiple neural waveforms that are detected in an intermingled state, and this poses a limit to readily analyzing neural waveforms.

SUMMARY

An objective of the disclosure is to provide an apparatus and a method for distinguishing neural waveforms that may accurately separate and distinguish multiple neural waveforms that are detected in an intermingled state.

An embodiment of the disclosure, conceived to achieve the objective above, provides a neural waveform distinguishment apparatus that includes: a neural waveform obtainment unit configured to obtain a multiple number of neural waveforms in a pre-designated manner from neural signals sensed by way of at least one electrode; a preprocessing unit configured to obtain a multiple number of gradient waveforms by calculating pointwise slopes in each of the neural waveforms; a feature extraction unit comprising an encoder ensemble composed of a multiple number of encoders, which have a pattern estimation method learned beforehand and include different numbers of hidden layers, where the feature extraction unit is configured to obtain a multiple number of codes as a multiple number of features extracted by the encoders respectively from the gradient waveforms and concatenate the multiple codes extracted by the multiple encoders respectively to extract a feature ensemble for each of the gradient waveforms; and a clustering unit configured to distinguish the multiple neural waveforms corresponding respectively to the multiple gradient waveforms by clustering the feature ensembles extracted respectively in correspondence to the gradient waveforms according to a pre-designated clustering technique.

The encoder ensemble may have multiple decoders coupled thereto during learning, where the decoders may be structured to correspond to the multiple encoders respectively, with each of the decoders configured to receive a code extracted from the gradient waveforms by a corresponding encoder from among the multiple encoders and recover the gradient waveforms inputted to the corresponding encoder according to a learned pattern recovery method, and where the learning may be performed as an error, which is calculated from the differences between the gradient waveforms and the recovered waveforms recovered by the decoders, is back-propagated through the decoders.

The encoder ensemble during learning may have the multiple encoders perform learning in the same manner using the same gradient waveforms.

The clustering unit may cluster the multiple feature ensembles into at least one cluster according to a density-based spatial clustering of applications with noise (DBSCAN) technique.

The neural waveform obtainment unit may include: a signal detection unit configured to obtain the neural signals by sampling raw-level neural signals of an analog form sensed by way of the at least one electrode and converting the raw-level neural signals into a digital form; and a waveform alignment unit configured to obtain the neural waveforms by extracting neural signals having intensities of a pre-designated threshold intensity or greater from among the neural signals and aligning the extracted neural signals in a pre-designated manner.

Another embodiment of the disclosure, conceived to achieve the objective above, provides a neural waveform distinguishment method that includes: obtaining a multiple number of neural waveforms in a pre-designated manner from neural signals sensed by way of at least one electrode; obtaining a multiple number of gradient waveforms by calculating pointwise slopes in each of the multiple neural waveforms; obtaining a multiple number of codes using an encoder ensemble composed of a multiple number of encoders that have a pattern estimation method learned beforehand and include different numbers of hidden layers, where the codes may be obtained as a multiple number of features extracted by the multiple encoders respectively from the multiple gradient waveforms; extracting a feature ensemble for each of the gradient waveforms by concatenating the codes extracted by the encoders respectively; and distinguishing the multiple neural waveforms corresponding respectively to the multiple gradient waveforms by clustering the feature ensembles extracted respectively in correspondence to the multiple gradient waveforms according to a pre-designated clustering technique.

An apparatus and a method for distinguishing neural waveforms according to certain embodiments of the disclosure may accurately distinguish neural waveforms by obtaining gradient waveforms for multiple neural waveforms sensed in an intermingled form, extracting different features for the gradient waveforms by using an encoder ensemble that includes multiple encoders having different depths, and separating the neural waveforms based on the extracted features. Thus, since even similar neural waveforms, which would be discarded as indistinguishable according to existing methods, may be automatically and accurately distinguished, certain embodiments of the disclosure may provide a basis for higher-level research into brain neuron functions.

Additional aspects and advantages of the present invention will be set forth in part in the description which follows, and in part will be obvious from the description, or may be learned by practice of the invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

To sufficiently understand the present invention, its advantages, and the objectives achieved by practice of the invention, it is necessary to refer to the appended drawings which illustrate preferred embodiments of the disclosure as well as the descriptions provided for the appended drawings.

The present disclosure is described in detail below, through a description of preferred embodiments of the disclosure with reference to the accompanying drawings. However, the invention may be implemented in various different forms and is not limited to the described embodiments. For a clearer understanding of the invention, parts that are not of great relevance to the invention have been omitted, and like reference numerals in the drawings are used to represent like elements.

Throughout the specification, reference to a part "including" or "comprising" an element does not preclude the existence of one or more other elements and can mean other elements are further included, unless there is specific mention to the contrary. Also, terms such as "unit", "device", "module", "block", etc., refer to units for processing at least one function or operation, where such units can be implemented as hardware, software, or a combination of hardware and software.

Figure 1:
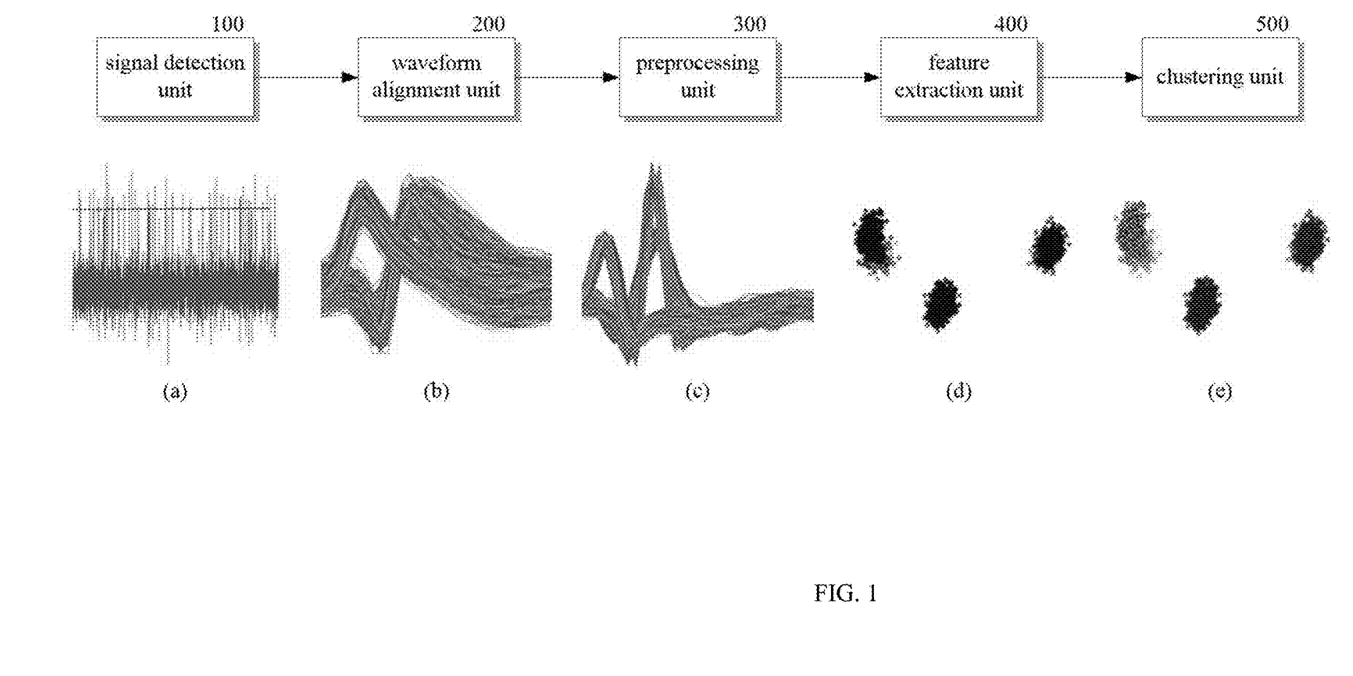
FIG. 1 conceptually illustrates the structure of a neural waveform distinguishment apparatus according to an embodiment of the disclosure.
Figure 2:
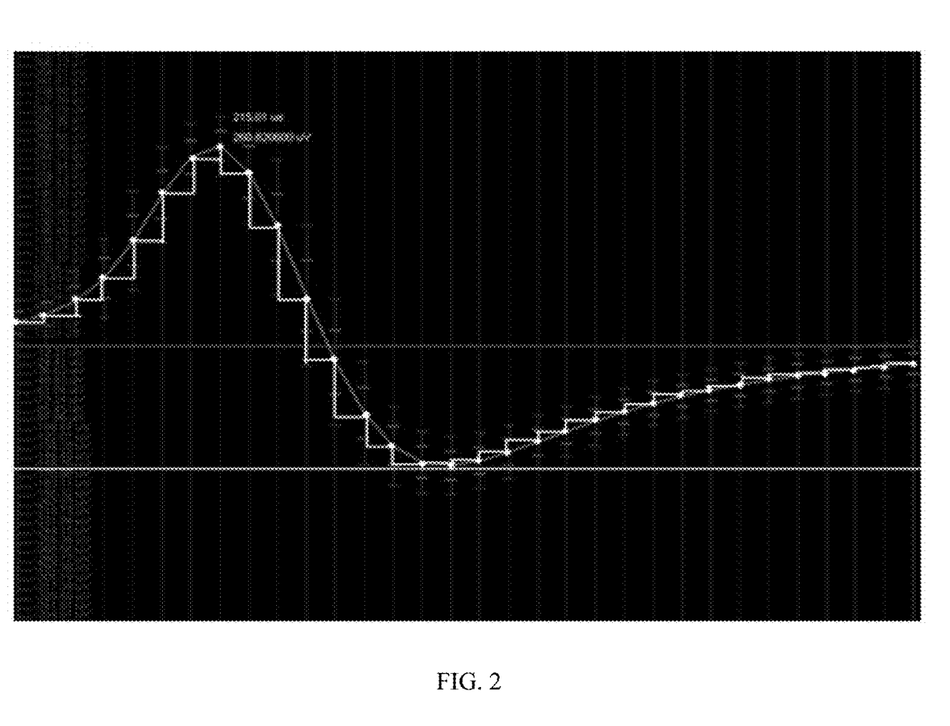
FIG. 2 illustrates a process by which the preprocessing unit of FIG. 1 obtains a gradient waveform from a neural waveform obtained by the neural waveform obtainment unit.

FIG. 1 conceptually illustrates the structure of a neural waveform distinguishment apparatus according to an embodiment of the disclosure, and FIG. 2 illustrates a process by which the preprocessing unit of FIG. 1 obtains a gradient waveform from a neural waveform obtained by the neural waveform obtainment unit.

Referring to FIG. 1, an apparatus for distinguishing neural waveforms according to this embodiment may include a signal detection unit 100, a waveform alignment unit 200, a preprocessing unit 300, a feature extraction unit 400, and a clustering unit 500.

For easier understanding, the signals or distinguishment results obtained by each component is illustrated in FIG. 1 under the respective component in parts (a) to (e).

The signal detection unit 100 may obtain a multiple number of neural signals, receiving the signals through at least one electrode that senses the electrical signals generated by the activity of the neurons.

The signal detection unit 100 may obtain raw-level neural signals through each of the at least one electrodes repeatedly for a pre-designated period of time and may sample the raw-level neural signals thus obtained to convert the signals into digital neural signals. Here, the intensity of the electrical signals generated at the neurons is very weak, and therefore the signal detection unit 100 may amplify the obtained raw-level neural signals and convert the amplified analog raw-level neural signals into digital neural signals by using an analog-digital converter, etc.

The waveform alignment unit 200 may obtain neural waveforms by extracting and aligning neural signals that have intensities greater than or equal to a pre-designated threshold intensity from among the neural signals obtained at the signal detection unit 100. Here, one reason for the waveform alignment unit 200 extracting neural signals of a threshold intensity or greater is to extract neural signals which have been generated at neurons that are undergoing meaningful activity, from among the neurons from which neural signals are detected. As illustrated in part (a), the neural signals that are obtained by sensing the electrical signals generated at neurons may be divided into multiple signals having small amplitudes and signals having large amplitudes expressed as spikes. Here, the signal components expressed as spikes are electrical signals generated when neurons perform meaningful activity. However, neurons may generate minute electrical signals even not performing meaningful activity. Moreover, noise may be included during the process of the signal detection unit 100 sensing and amplifying the electrical signals of very weak intensities generated at the neurons. Thus, the neural signals obtained may include signals having small amplitudes and large spike signals having large amplitudes.

As such, the waveform alignment unit 200 may extract only the spike signals of a pre-designated threshold intensity or greater, align these signals in a pre-designated manner, and obtain neural waveforms, to thereby allow an analysis of meaningful neuron activity.

The signal detection unit 100 and the waveform alignment unit 200 may be integrated as a neural waveform obtainment unit. The procedures by which the signal detection unit 100 detects neural signals and the waveform alignment unit 200 obtains neural waveforms from the neural signals are the same as those known in the art and therefore will not be described here in detail.

The neural waveforms obtained by the waveform alignment unit 200 may include multiple neural waveforms as illustrated in part (b). The multiple number of (for example, 4000) neural waveforms obtained during the pre-designated period of time may include waveforms having similar patterns, where waveforms having similar patterns may be regarded as waveforms of neural signals generated at the same neuron or waveforms of neural signals generated at neurons undergoing the same activity. Therefore, in order to analyze neural waveforms, the multiple neural waveforms should be distinguished by separating them into waveforms having similar patterns.

However, separating the waveforms using the multiple neural waveforms as is may not be an easy task. The multiple neural waveforms illustrated in part (b) should actually be separated into three waveforms, but as the waveforms are detected with two of the neural waveforms overlapping at numerous points, it may be very difficult to determine the groups into which each of the neural waveforms are to be distinguished. In the past, neural waveforms that could not be clearly distinguished were discarded, and the distinguishing was performed only for the distinguishable neural waveforms. Although in recent times there have been attempts to distinguish multiple neural waveforms by using an artificial neural network, there is a limit to the performance of the distinguishment, even when an artificial neural network is used, if the neural networks overlap at very many points as described above.

However, with the present embodiment, the preprocessing unit 300 may obtain multiple gradient waveforms representing pointwise slopes from the multiple neural waveforms, respectively. The preprocessing unit 300, as illustrated in FIG. 2 for instance, may obtain slopes according to intensity differences at sampling positions of pre-designated intervals for each of the multiple neural waveforms and may use the slopes thus obtained to obtain gradient waveforms. The preprocessing unit 300 may obtain the gradient waveform X for an N-th neural waveform P, for example, according to Equation 1.

$$X(N, j) = \frac{P(j+v) - P(j)}{v} (j = 1, 2, \ldots, k) \quad \text{[Equation 1]}$$

Here, v represents the n-interval slope value for neural waveform P.

Part (c) illustrates the gradient waveforms for the neural waveforms of part (b), and it may be seen that, in part (c), waveforms having similar patterns may be more clearly differentiated compared to part (b).

Also, the preprocessing unit 300 may perform normalization such that the obtained gradient waveforms are waveforms within a pre-designated range. For instance, the preprocessing unit 300 may normalize the gradient waveforms such that they are waveforms having values from 0 to 1.

When multiple gradient waveforms are obtained by the preprocessing unit 300 for the multiple neural waveforms, respectively, the feature extraction unit 400 may extract features from each of the obtained gradient waveforms.

The feature extraction unit 400 may be implemented as an artificial neural network that has already finished learning and may extract multiple features from each of the multiple gradient waveforms. In particular, a feature extraction unit 400 based on this embodiment may include an encoder ensemble composed of a multiple number of encoders based on auto-encoders, so that each of the multiple encoders may extract features from each of the multiple gradient waveforms.

For example, if the encoder ensemble is composed of three encoders, and each of the three encoders extract three features from individual gradient waveforms, then the feature extraction unit may extract nine features for each gradient waveform. Here, a set of features extracted by each of the encoders may be referred to as a code. Also, a set of codes extracted by the multiple encoders of the encoder ensemble for each gradient waveform may be referred to as a feature ensemble.

The multiple feature ensembles extracted respectively for the multiple gradient waveforms may be projected to specific positions in a space of a pre-designated dimension (e.g. a 3-dimensional space) according to the values of the features included in the feature ensembles, as illustrated in part (d). In part (d), each of the multiple points represents a feature ensemble projected onto the coordinates of a specific position in space.

The multiple encoders forming the encoder ensemble may be formed as auto-encoders coupled with their corresponding decoders during learning and may undergo learning beforehand by each receiving the same gradient waveform to extract a code and recovering the gradient waveform again from the extracted code for output. That is, the multiple auto-encoders may perform learning in the same manner using the same learning data. However, the multiple encoders forming the encoder ensemble may be formed to include different numbers of hidden layers, so that different features may be extracted even with the same learning.

A more detailed description of the feature extraction unit 400 will be provided later on.

When multiple feature ensembles are extracted for each of the multiple gradient waveforms at the feature extraction unit 400, the clustering unit 500 may perform clustering by separating the multiple ensembles extracted for the respective gradient waveforms in a pre-designated manner. The multiple clustered feature sets may be regarded as having corresponding neural waveforms that share similar features. That is, the multiple neural waveforms corresponding to the multiple feature ensembles grouped into the same cluster may be regarded as having similar patterns. Since neural waveforms having features ensembles similar to one another are waveforms of neural signals that have been generated by the same neurons or by neurons undergoing the same activity as described above, the neural waveforms generated by neurons currently performing meaningful activity may be accurately differentiated.

Here, the clustering unit 500 may use any of a variety of algorithms, such as the K-means clustering algorithm, the Gaussian mixture model (GMM) algorithm, the density-based spatial clustering of applications with noise (DB- SCAN) algorithm, etc., for clustering the multiple feature sets. Here, an example is assumed in which the clustering unit 500 uses DBSCAN. Unlike other existing clustering algorithms that are based on distances between groups, the DBSCAN performs clustering based on density. Thus, the DBSCAN provides the advantage of enabling the clustering of points arranged in various geometrical forms by determining zones of high density where the points projected from feature sets are densely populated and clustering the points according to the determined zones. In particular, since there is no need to define the number of clusters beforehand, this algorithm is suitable for distinguishing neural waveforms in cases where the number of neural waveforms detected by the electrode cannot be predicted beforehand.

That is, the clustering unit 500 may separate and distinguish the neural waveforms corresponding respectively to the multiple feature ensembles, as illustrated in part (e).

Figure 3:
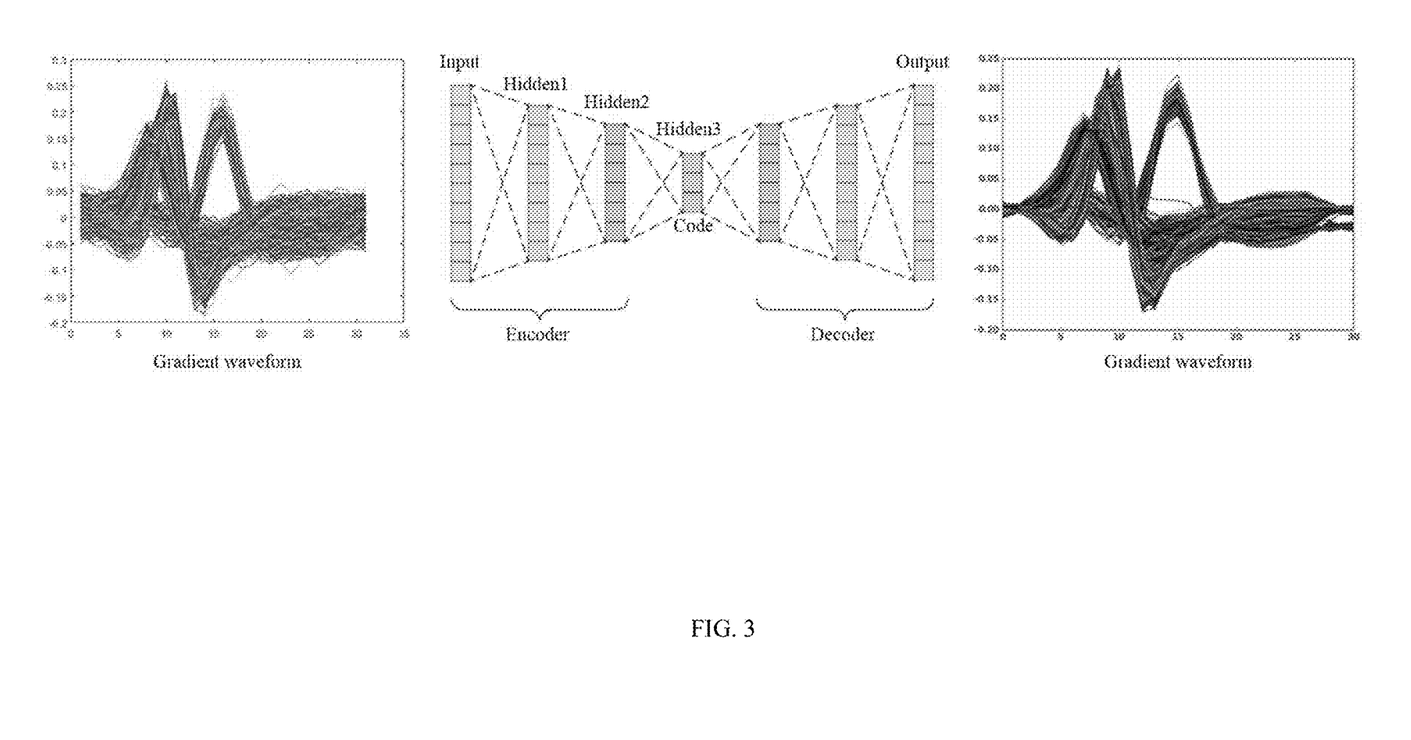
FIG. 3 conceptually illustrates the structure and learning method of an auto-encoder.
Figure 4:
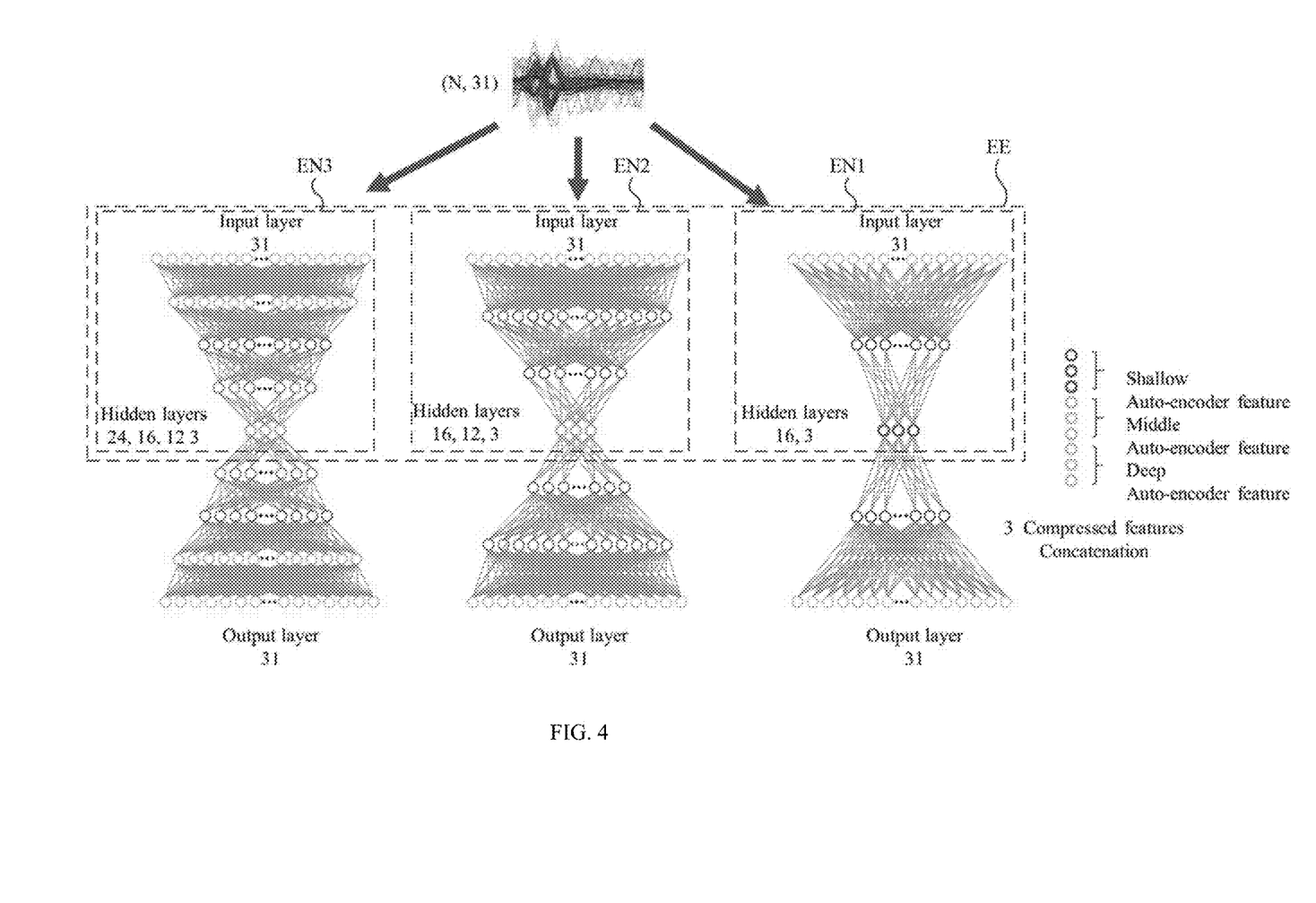
FIG. 4 illustrates feature ensembles extracted by the encoder ensemble of FIG. 1.
Figure 5:
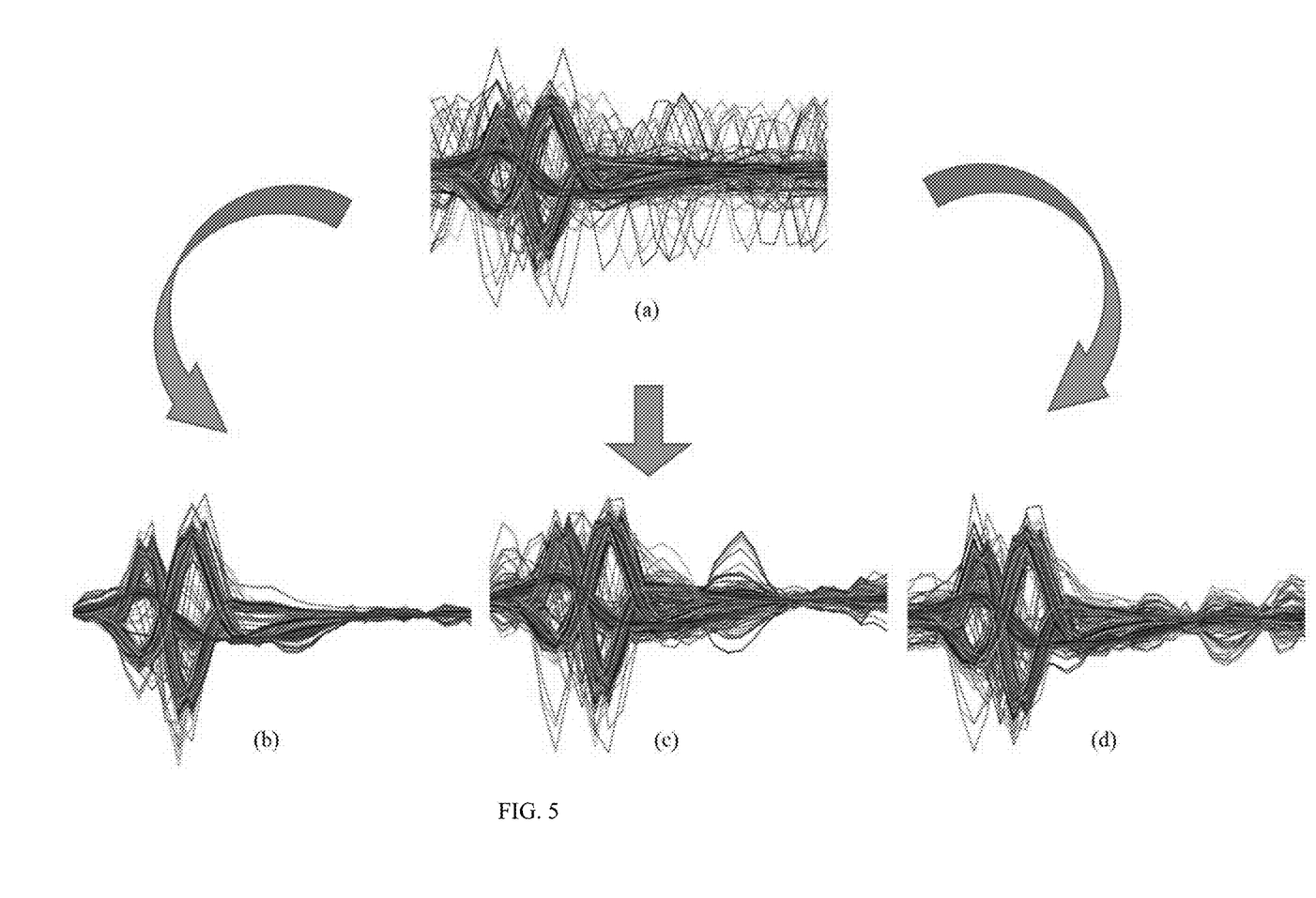
FIG. 5 illustrates differences in waveforms recovered by decoding the multiple codes extracted respectively from the multiple auto-encoders of FIG. 4.

FIG. 3 conceptually illustrates the structure and learning method of an auto-encoder, FIG. 4 illustrates feature ensembles extracted by the encoder ensemble of FIG. 1, and FIG. 5 illustrates differences in waveforms recovered by decoding the multiple codes extracted respectively from the multiple auto-encoders of FIG. 4.

Referring to FIG. 3, the encoder of an auto-encoder may be implemented as an artificial neural network of a multi-layer perceptron structure and may include multiple hidden layers to extract multiple features from the inputted gradient waveforms. FIG. 3 illustrates an example of an encoder that includes one input layer (Input) and three hidden layers (Hidden1~Hidden3). Among the hidden layers, the third hidden layer (Hidden3) may output a pre-designated number of features. The encoder may extract the multiple features as values within a pre-designated range, and the concatenation of features extracted by the encoder is a code.

Although an example is illustrated here in which the encoder extracts three features as a code, the number of features extracted by the encoder may be varied. Likewise, the number of hidden layers may also be varied.

However, in order for the encoder to extract multiple features from an inputted gradient waveform, it must have finished learning beforehand. Thus, in FIG. 3, a decoder for learning the encoder is additionally coupled to form the auto-encoder. As the decoder is a component for learning the encoder, it may be removed once the learning for the encoder is complete and may not be included in the feature extraction unit 400. In short, the decoder may be excluded from the composition of the encoder ensemble.

Describing the learning method of the auto-encoder with reference to FIG. 3, the auto-encoder may receive the gradient waveforms obtained from the slopes of the neural waveforms and may extract multiple features, i.e. a code, according to a learned pattern estimation method. The extracted code may be delivered to the decoder, and the decoder may recover the waveforms according to a learned pattern recovery method from the received code.

Although it is not shown in the drawings, a learning unit may further be included, in addition to the decoder, during the learning of the encoder. The learning unit may receive the waveforms recovered at the decoder, compare the recovered waveforms with the inputted neural waveforms from which the inputted gradient waveforms were extracted, and may obtain the differences between the two types of waveforms resulting from the comparison as error. The error thus obtained may be back-propagated to the decoder and encoder. That is, the encoder and decoder may perform learning simultaneously. Here, the learning process may be iterated until the error is within a pre-designated threshold error or until a pre-designated number of iterations is reached.

As described above, since the learning of the auto-encoder may be performed using the neural waveforms, which are the original signals from which the gradient waveforms are extracted, it may not be necessary to separately collect learning data. Thus, the auto-encoder may readily perform learning.

FIG. 4 illustrates an example in which the encoder ensemble EE is composed of three encoders EN1~EN3. In FIG. 4, it is assumed that the three encoders EN1~EN3 all receive thirty one input values through their input layers in the same manner. That is, thirty one values may be received as input values from the gradient waveforms. This is because, in this embodiment, it is assumed that the signal detection unit 100 performs sampling and obtains neural waveforms thirty two times during a pre-designated period, and the preprocessing unit 300 obtains the gradient waveforms by using the differences between the values at the thirty two sampling positions of the neural waveforms, so that there are thirty one values from the gradient waveforms. Of course, the number of input values may be varied.

In the example shown in FIG. 4, a first encoder EN1 from among the three encoders EN1~EN3 includes two hidden layers, a second encoder EN2 includes three hidden layers, and a third encoder EN3 includes four hidden layers. That is, the encoders EN1~EN3 of the encoder ensemble EE may include different numbers of hidden layers. This is so that, even through the encoders EN1~EN3 of the encoder ensemble EE perform learning in the same manner, different features may be extracted from the received gradient waveforms.

That is, the first encoder EN1 may have a shallow depth, the second encoder EN2 may have a middle depth, and the third encoder EN3 may have a deep depth, so as to extract different features.

The decoders corresponding respectively to the three encoders EN1~EN3 may also be formed with depths corresponding to those of their counterpart encoders EN1~EN3, as illustrated in FIG. 4.

The multiple encoders EN1~EN3 having different depths may extract different features, even though the same gradient waveform extracted from a single neural waveform is inputted, and when a corresponding decoder decodes the features extracted by each encoder EN1~EN3, three neural waveforms may be obtained, which are similar to one another but not identical. One reason for such differences occurring in the neural waveforms outputted by the decoders is that, even though the multiple encoders EN1~EN3 each extract three features, the levels of the features that can be implicitly extracted from the extracted gradient signals may differ depending on the number of hidden layers.

Referring to FIG. 5, it may be seen that, compared to the neural waveforms shown in part (b) that are obtained by decoding the features extracted from the first encoder EN1 having a shallow depth, the neural waveforms shown in part (d) that are obtained by decoding the features extracted from the third encoder EN3 having a deep depth include more details. However, since the first encoder EN1 having a shallow depth of part (b) is able to extract rough features of the gradient waveforms from a larger context, it may be suitable for roughly separating the neural waveforms. That is, the first encoder EN1 having a shallow depth may be regarded as extracting features to allow an accurate extraction of the number of neural waveforms distinguished, etc., and the third encoder EN3 having a deep depth may be regarded as extracting features to allow a determining of the clusters in which the neural waveforms should be included.

FIG. 6A to FIG. 6D illustrate the results of clustering the feature ensembles as compared with the results of individually clustering the features extracted respectively by the multiple auto-encoders of the feature extraction unit of FIG. 1.

Figure 6A:
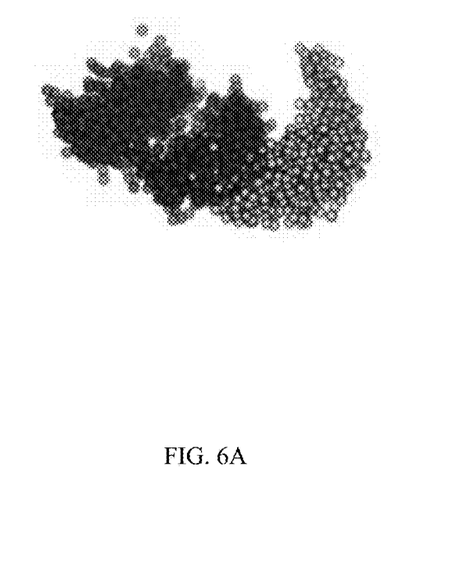
FIG. 6A, FIG. 6B, FIG. 6C, and FIG. 6D illustrate the results of clustering the feature ensembles as compared with the results of individually clustering the features extracted respectively by the multiple auto-encoders of the feature extraction unit of FIG. 1.
Figure 6B:
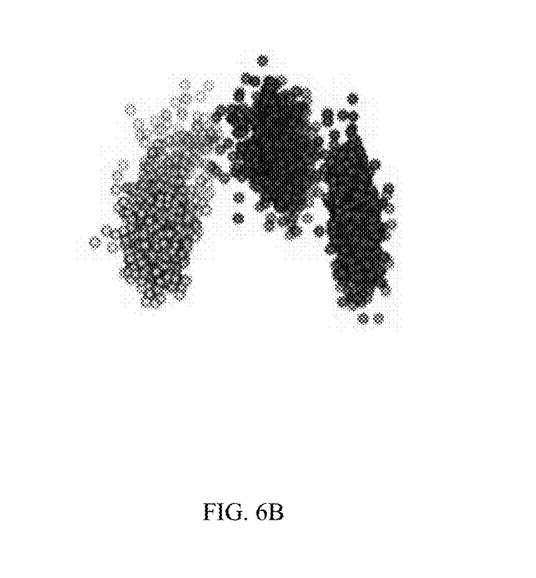
Figure 6C:
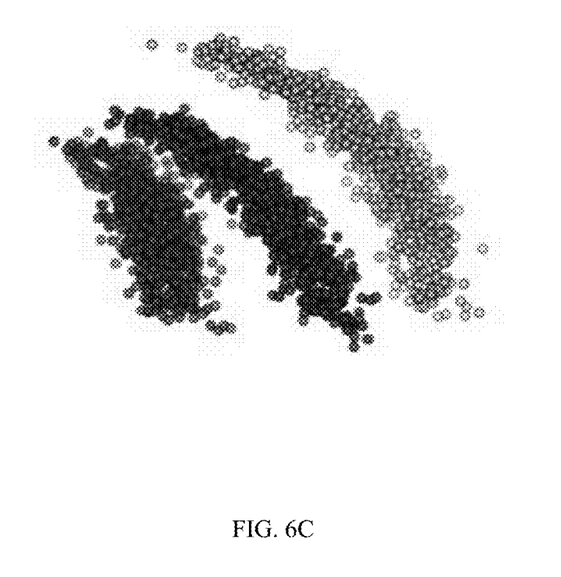
Figure 6D:
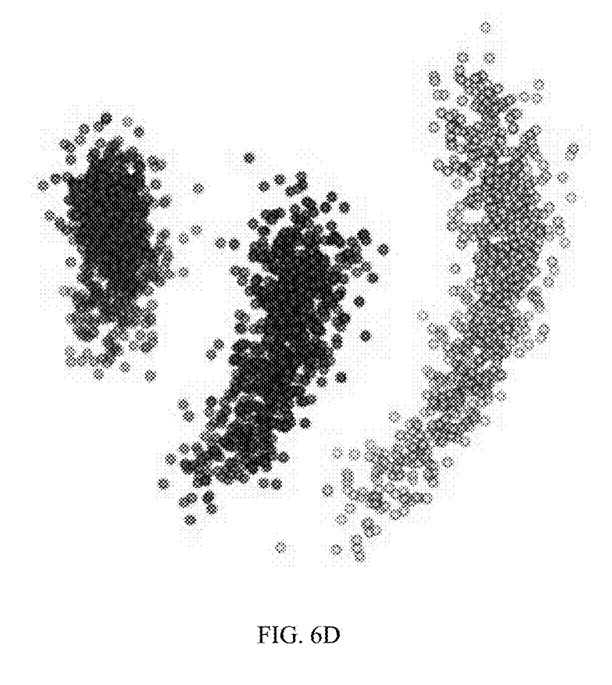

FIGS. 6A to 6C show the results of the clustering unit 500 performing clustering on the features extracted from the three encoders EN1~EN3 of FIG. 5, respectively, and FIG. 6D shows the results of the clustering unit 500 performing clustering on the feature ensembles, which are formed by concatenating the features extracted from the three encoders EN1~EN3.

From FIGS. 6A to 6C, it can be seen that, basically, a greater depth of the encoder EN1~EN3 allows a more clear distinguishment of the neural waveforms. However, as illustrated in FIG. 6C, there is a limit to how high the performance of the distinguishment can reach with just increasing the depth of the encoder. On the other hand, if the clustering is performed using feature ensembles, which are formed by concatenating the features extracted from encoders EN1~EN3 having different depths, it can be seen that each neural waveform can be clearly and accurately distinguished as illustrated in FIG. 6D.

Figure 7:
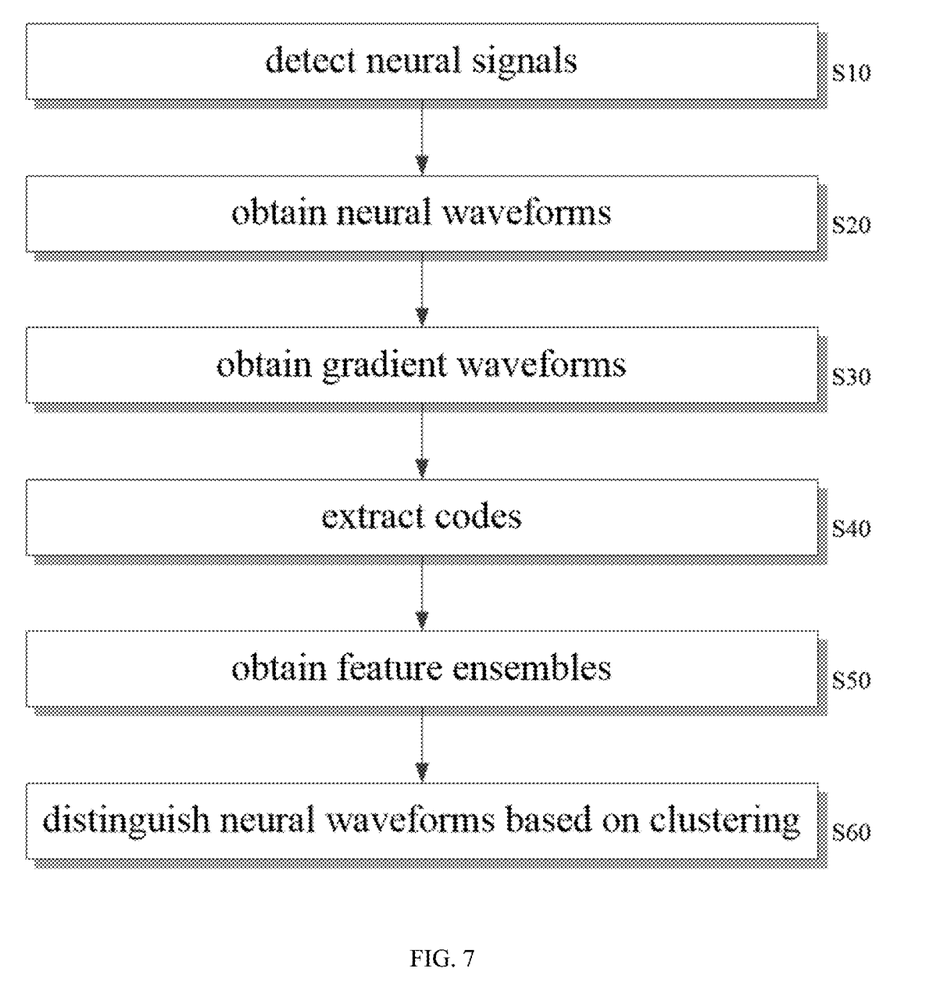
FIG. 7 illustrates a neural waveform distinguishment method according to an embodiment of the disclosure.

FIG. 7 illustrates a neural waveform distinguishment method according to an embodiment of the disclosure.

Looking at the method for distinguishing neural waveforms of FIG. 7 with reference to FIGS. 1 to 6D, the neural signals transferred through the electrode may first be detected (S10). Here, raw-level neural signals of analog form may be transferred through the electrode, and the transferred raw-level neural signals may be amplified and sampled to obtain neural signals of a digital form.

When the neural signals are detected, neural signals having intensities of a pre-designated threshold intensity or higher from among the detected neural signals may be extracted and may be aligned in a pre-designated manner to obtain a multiple number of neural waveforms (S20). Then, pointwise slopes for each of the obtained neural waveforms may be calculated to obtain a multiple number of gradient waveforms (S30).

When the gradient waveforms are obtained, the obtained gradient waveforms may be delivered to an encoder ensemble formed by multiple encoders that have already learned a pattern estimation method, and multiple features may be extracted from each of the gradient waveforms by each of the multiple encoders. Here, the multiple encoders may perform learning in the same manner using the same learning data but may include different numbers of hidden layers to extract different features from the same gradient waveforms. Here, a concatenation of multiple features extracted from a single gradient waveform by each of the multiple encoders is referred to as a code. That is, the encoder ensemble formed by multiple encoders may extract a multiple number of codes for each of the multiple number of gradient waveforms (S40).

The multiple codes extracted for each gradient waveform may be concatenated in a pre-designated manner to obtain a feature ensemble (S50).

When the multiple feature ensembles for the multiple gradient waveforms are obtained, the neural waveform corresponding to each feature ensemble may be distinguished (S60) by clustering the obtained feature ensembles using a pre-designated clustering algorithm.

Figure 8:
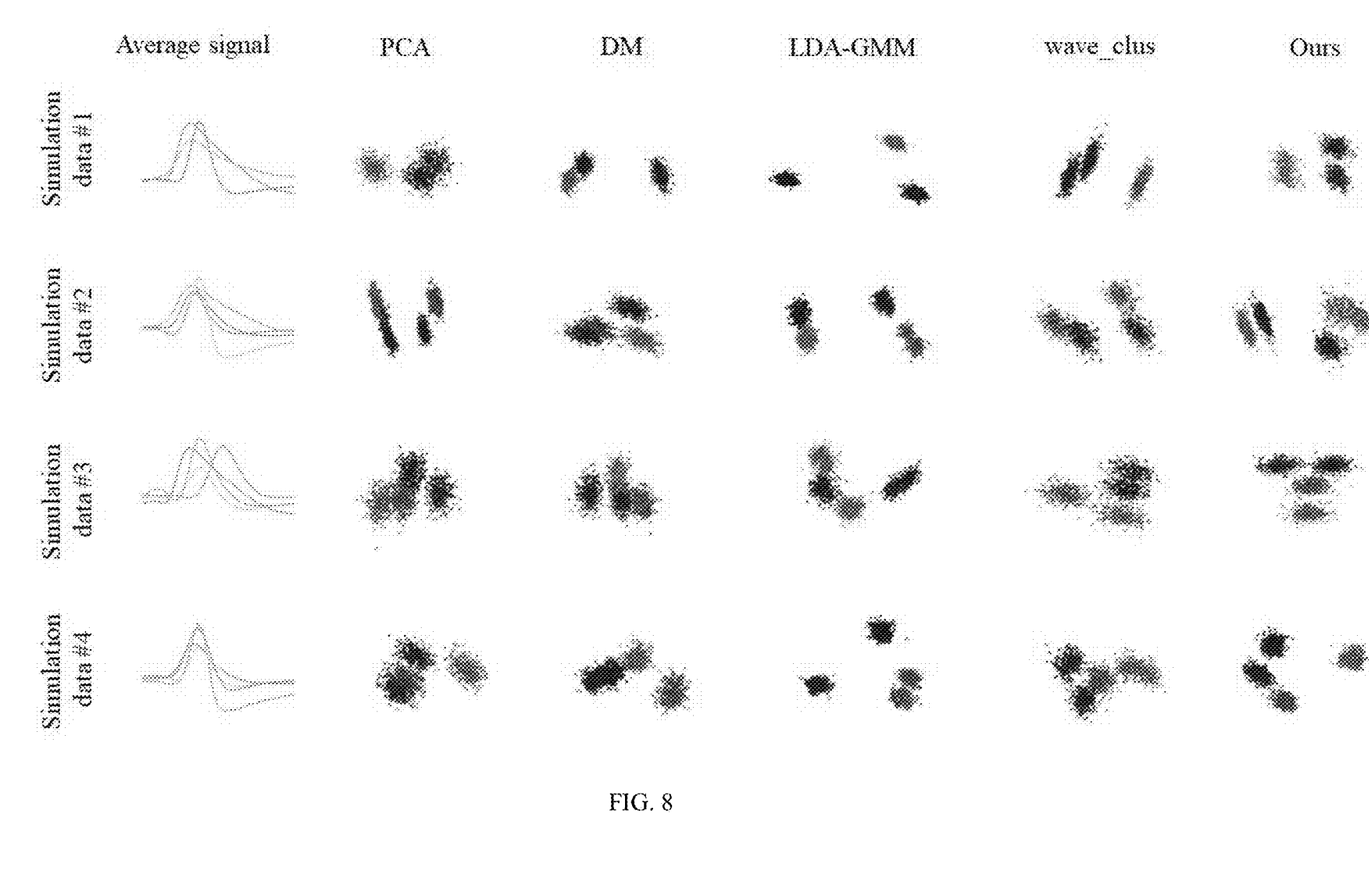
FIG. 8 illustrates the performance of neural waveform distinguishment by an apparatus and a method for distinguishing waveforms according to an embodiment of the disclosure.

FIG. 8 illustrates the performance of neural waveform distinguishment by an apparatus and a method for distinguishing waveforms according to an embodiment of the disclosure.

FIG. 8 shows the results of distinguishing neural waveforms according to this embodiment by obtaining gradient waveforms from the neural waveforms and extracting and clustering the features of the obtained gradient waveforms using an encoder ensemble, as compared to the results from existing methods for distinguishing neural waveforms.

As illustrated at the right end of FIG. 8, it can be seen that the neural waveform distinguishment method based on this embodiment allows a much clearer differentiation of the neural waveforms according to their features than do the other neural waveform distinguishment methods based on the related art.

Consequently, the apparatus and method for distinguishing neural waveforms according to this embodiment are able to accurately distinguish neural waveforms and may thus provide a basis for higher-level research into the functions of brain neurons.

A method according to an embodiment of the disclosure may be implemented as a computer program stored in a medium for execution on a computer. Here, the computer-readable medium may be an arbitrary medium available for access by a computer, where examples may include all types of computer storage media. Examples of a computer storage medium may include volatile and non-volatile, detachable and non-detachable media implemented based on an arbitrary method or technology for storing information such as computer-readable instructions, data structures, program modules, or other data, and may include ROM (read-only memory), RAM (random access memory), CD-ROM's, DVD-ROM's, magnetic tapes, floppy disks, optical data storage devices, etc.

While the present invention is described with reference to embodiments illustrated in the drawings, these are provided as examples only, and the person having ordinary skill in the art would understand that many variations and other equivalent embodiments may be derived from the embodiments described herein.

Therefore, the true technical scope of the present invention is to be defined by the technical spirit set forth in the appended scope of claims.

What is claimed is:

1. An electronic device for representing neural waveforms by providing a multi-dimensional grouping of clustered feature ensembles comprising:

a processor including a central processing unit capable of executing a computer program, a display, and a memory connected to the processor, wherein the memory stores program instructions for providing a multi-dimensional grouping of clustered feature ensembles that, when executed, cause the processor to obtain a plurality of neural waveforms from neural signals sensed by at least one electrode;

calculate pointwise slopes in each of the plurality of neural waveforms to obtain a plurality of gradient waveforms;

extract a plurality of features from the plurality of gradient waveforms using an encoder ensemble including a plurality of encoders executing a pre-learned pattern estimation method, each of the plurality of encoders using a different number of hidden layers to extract the plurality of features from the same plurality of gradient waveforms;

extract a plurality of codes for each of the plurality of gradient waveforms by concatenating the plurality of extracted features, respectively;

extract a plurality of feature ensembles for each of the plurality of gradient waveforms by concatenating the plurality of extracted codes, respectively; and cluster the plurality of feature ensembles to distinguish the plurality of neural waveforms corresponding each of the plurality of gradient waveforms, wherein the encoder ensemble includes a plurality of decoders that correspond respectively to the plurality of encoders, each of the decoders configured to receive a code extracted from the gradient waveforms by a corresponding encoder and to recover the gradient waveforms inputted to the corresponding encoder according to a learned pattern recovery method, wherein learning by the plurality of encoders is performed as an error, calculated from differences between the gradient waveforms and recovered waveforms recovered by the decoders, that is back-propagated by way of the decoders, and wherein the clustered feature ensembles distinguishing the plurality of neural waveforms are displayed on the display, wherein the different number of hidden layers is set for each of the plurality of encoders so that each of the plurality of encoders outputs different features for the same plurality of gradient waveforms, wherein the same plurality of gradient waveforms is input to each of the plurality of encoders.

2. The electronic device of claim 1, wherein the learning by each of the plurality of encoders is performed in the same manner using the same gradient waveforms.

3. The electronic device of claim 1, wherein the plurality of feature ensembles are clustered into at least one clustered feature ensemble according to a density-based spatial clustering of applications applying a noise (DBSCAN) technique.

4. The electronic device of claim 1,
wherein the neural signals are obtained by sampling raw-level neural signals in analog form sensed by the at least one electrode and converting the raw-level neural signals into digital neural signals, extracting the digital neural signals with intensities at or above a pre-designated threshold intensity, and aligning the digital neural signals with intensities at or above a pre-designated threshold intensity in a pre-designated manner.

5. A method for distinguishing neural waveforms, the method comprising:

providing a processor including a central processing unit capable of executing a computer program, a display, and a memory connected to the processor, wherein the memory stores program instructions for providing a multi-dimensional grouping of clustered feature ensembles, including instructions for obtaining a plurality of neural waveforms in a pre-designated manner from neural signals sensed by way of at least one electrode;

obtaining a plurality of gradient waveforms by calculating pointwise slopes in each of the plurality of neural waveforms;

obtaining a plurality of codes using an encoder ensemble, the encoder ensemble composed of a plurality of encoders having a previously learned pattern estimation method and each having different numbers of hidden layers, the plurality of codes obtained as a plurality of features extracted by the plurality of encoders from the same plurality of gradient waveforms;

extracting a feature ensemble for each of the plurality of gradient waveforms by concatenating the plurality of codes extracted by the plurality of encoders, respectively;

distinguishing the plurality of neural waveforms corresponding respectively to the plurality of gradient waveforms by clustering a plurality of feature ensembles extracted respectively in correspondence to the plurality of gradient waveforms according to a pre-designated clustering technique; and displaying the clustered plurality of feature ensembles that distinguish the plurality of neural waveforms on a display, wherein the encoder ensemble includes a plurality of decoders that correspond respectively to the plurality of encoders, each of the decoders configured to receive a code extracted from the gradient waveforms by a corresponding encoder and to recover the gradient waveforms inputted to the corresponding encoder according to a learned pattern recovery method, and wherein learning by the plurality of encoders is performed as an error, calculated from differences between the gradient waveforms and recovered waveforms recovered by the decoders, that is back-propagated by way of the decoders, wherein the different number of hidden layers is set for each of the plurality of encoders so that each of the plurality of encoders outputs different features for the same plurality of gradient waveforms, wherein the same plurality of gradient waveforms is input of each of the plurality of encoders.

6. The method of claim 5, wherein the distinguishing the plurality of neural waveforms comprises clustering the plurality of feature ensembles into at least one cluster according to a density-based spatial clustering of applications with a noise (DBSCAN) technique.

7. The method of claim 5, wherein the obtaining of the plurality of neural waveforms comprises sampling raw-level neural signals of an analog form sensed by way of the at least one electrode and converting the raw-level neural signals into a digital form; and obtaining the plurality of neural waveforms by extracting neural signals having intensities of a pre-designated threshold intensity or greater from among the neural signals and aligning the extracted neural signals in a pre-designated manner.

* * * * *